United States Patent
Berreyesa et al.

(10) Patent No.: US 12,096,776 B2
(45) Date of Patent: Sep. 24, 2024

(54) PLANT NUTRIENT FORMULATION AND METHOD FOR PREPARING THE SAME

(71) Applicants: Max Berreyesa, Occidental, CA (US); Justin Austin Cogswell, Garberville, CA (US)

(72) Inventors: Max Berreyesa, Occidental, CA (US); Justin Austin Cogswell, Garberville, CA (US)

(*) Notice: Subject to any disclaimer, the term of this patent is extended or adjusted under 35 U.S.C. 154(b) by 71 days.

(21) Appl. No.: 17/898,905

(22) Filed: Aug. 30, 2022

(65) Prior Publication Data

US 2024/0081344 A1  Mar. 14, 2024

(51) Int. Cl.
| | |
|---|---|
| *A01N 65/03* | (2009.01) |
| *A01N 37/10* | (2006.01) |
| *A01N 37/40* | (2006.01) |
| *A01P 21/00* | (2006.01) |

(52) U.S. Cl.
CPC ............ *A01N 65/03* (2013.01); *A01N 37/10* (2013.01); *A01N 37/40* (2013.01); *A01P 21/00* (2021.08)

(58) Field of Classification Search
None
See application file for complete search history.

(56) References Cited

U.S. PATENT DOCUMENTS

| | | | |
|---|---|---|---|
| 3,630,710 A | 12/1971 | Frederickson | |
| 3,940,257 A | 2/1976 | Sherwin et al. | |
| 3,973,355 A | 8/1976 | McKenzie | |
| 4,026,695 A | 5/1977 | Young | |
| 4,180,392 A | 12/1979 | Ishibashi et al. | |
| 4,255,898 A | 3/1981 | Greenbaum | |
| 4,494,976 A | 1/1985 | Backlund | |
| 4,531,962 A | 7/1985 | Achorn et al. | |
| 5,201,930 A | 4/1993 | Campbell | |
| 5,733,355 A | 3/1998 | Hibino et al. | |
| 5,979,111 A | 11/1999 | Brown et al. | |
| 6,021,602 A | 2/2000 | Orsi | |
| 6,194,193 B1 | 2/2001 | Drahos et al. | |
| 6,332,287 B1 | 12/2001 | Geraldson | |
| 7,776,124 B2 | 8/2010 | Binder et al. | |
| 7,823,328 B2 | 11/2010 | Walhovd | |
| 8,562,710 B2 | 10/2013 | Palmer et al. | |
| 9,067,840 B1 | 6/2015 | Berreyesa | |
| 9,314,031 B2 * | 4/2016 | Haas | A01N 37/42 |
| 9,382,166 B1 | 7/2016 | Joblin, Jr. et al. | |
| 9,738,567 B1 | 8/2017 | Taganov et al. | |
| 10,118,869 B1 | 11/2018 | Sarah | |
| 10,843,978 B1 * | 11/2020 | Hernandez | C05B 17/00 |
| 11,040,920 B2 | 6/2021 | Shirley, Jr. et al. | |
| 11,124,461 B2 | 9/2021 | Walker et al. | |
| 11,751,573 B2 * | 9/2023 | Port-Louis | C05F 11/10 504/117 |
| 2004/0011101 A1 | 1/2004 | Newton et al. | |
| 2005/0022569 A1 | 2/2005 | Varshovi | |
| 2008/0282610 A1 | 11/2008 | Bissonnette et al. | |
| 2009/0266125 A1 | 10/2009 | Doan | |
| 2018/0000028 A1 | 1/2018 | Suntych | |
| 2020/0048156 A1 * | 2/2020 | Yamashita | A01N 65/00 |
| 2020/0337315 A1 * | 10/2020 | Port-Louis | A01N 65/03 |

FOREIGN PATENT DOCUMENTS

| | | | |
|---|---|---|---|
| AU | 2016101635 | | 10/2016 |
| CN | 104829288 | * | 8/2015 |
| EP | 0152685 | | 8/1985 |
| GB | 2532467 | | 5/2016 |
| JP | 2022-510271 | | 1/2022 |
| WO | WO 00/36085 | | 6/2000 |

OTHER PUBLICATIONS

Abstract of CN 104829288 (Aug. 12, 2015).*

* cited by examiner

*Primary Examiner* — John Pak
(74) *Attorney, Agent, or Firm* — King & Partners, PLC (57) ABSTRACT

A plant nutrient formulation, including: a solvent; a first plant hormone; a second plant hormone; an optional surfactant/wetting agent; and an optional colorant.

5 Claims, 4 Drawing Sheets

PLANT NUTRIENT FORMULATION AND METHOD FOR PREPARING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to nutrient formulations, and, more particularly, to novel, hormone-based formulations for plantae and fungi that are optimized using a multi-component hormone system. The nutrient formulations of the present invention, among other things, facilitate rapid uptake of nutrients, reduce growth time/cycle by one-third and in some cases by one-half, produce larger plants, fruits, and vegetables, and improve plant and fungi immunity.

2. Background Art

Plant nutrient formulations and fertilizers have been known in the art for years and are the subject of a plurality of patents and/or publications, including: U.S. Pat. No. 11,124,461 entitled "Fertilizer," U.S. Pat. No. 11,040,920 entitled "Fertilizer and Plant Growth Promoter to Increase Plant Yield and Method of Increasing Plant Yield," U.S. Pat. No. 10,118,869 entitled "Fertilizer," U.S. Pat. No. 9,738,567 entitled "Soluble Fertilizer Formulation and Method for Use Thereof," U.S. Pat. No. 9,382,166 entitled "Plant Nutrient Composition," U.S. Pat. No. 8,562,710 entitled "Fertilizer Composition," U.S. Pat. No. 7,776,124 entitled "Fertilizer Compositions and Methods of Using," U.S. Pat. No. 6,194,193 entitled "Nutrient Plant Formulation with Microbial Strains," U.S. Pat. No. 5,733,355 entitled "Bacterial Preparation for Agricultural Use," U.S. Pat. No. 4,531,962 entitled "Production of Acid-Type Fertilizer Solutions," U.S. Pat. No. 4,494,976 entitled "Fertilizers Containing Nitrogen and Micronutrients," U.S. Pat. No. 4,180,392 entitled "Method for Producing Organic Fertilizers," U.S. Pat. No. 4,026,695 entitled "Particulate Multicomponent Soil Additive," U.S. Pat. No. 3,630,710 entitled "Production of Metabolic Demand Seaweed-Type Fertilizer," United States Patent Application Publication Number 2005/0022569 entitled "Organic-Based Fertilizer," International Patent Publication Number WO 00/36085 entitled "Liquid Nutrient Plant Formulation with Microbial Strains," and Australian Patent Number AU 2016101635 entitled "A Biological Carbon-Based Organic Fertilizer and Its Preparation Method"—all of which are hereby incorporated herein by reference in their entirety including all references cited therein.

U.S. Pat. No. 11,124,461 appears to disclose a dry and solid fertilizer in the form of discreet particles. The particles of the dry and solid fertilizer comprise a homogenous mixture of organic and inorganic materials. The inorganic material comprises at least one of the NPKS nutrients. The organic material comprises a carbon-labile substantially sterile product of organic waste.

U.S. Pat. No. 11,040,920 appears to disclose a slow release carbohydrate/bicarbonate/nitrogen fertilizer which includes: a nitrogen component selected from the group consisting of a urea compound, ammonium bicarbonate, ammonium sulfate and ammonium nitrate; a bicarbonate component selected from the group consisting of ammonium bicarbonate, potassium bicarbonate and sodium bicarbonate; and a soluble carbohydrate component selected from the group consisting of a starch and a sugar, wherein the fertilizer is applied to increase crop yield and increase protein levels in plant products by placing the aforesaid fertilizer beneath the surface of soil on which is growing cultivated plants.

U.S. Pat. No. 10,118,869 appears to disclose a fertilizer which is a mixture of organic matter from animal and plant sources, nematode controllers, carbohydrates, minerals, and mycorrhizal inoculum. It contains guano, kelp meal, neem cake, dry molasses, clay, magnesium sulfate and mycorrhizae. In one embodiment, the mixture is made of the following amounts by weight: 55% high-nitrogen bat guano; 12.5% high-phosphorous bat guano; 12.5% kelp meal; 10% neem cake; and 2.5% each of dry molasses, montmorillonite clay, magnesium sulfate, and mycorrhizae of the Glomus genus. Versions of the fertilizer directed to specific plant species may contain additional ingredients, such as indole-3-butyric acid.

U.S. Pat. No. 9,738,567 appears to disclose a fertilizer that includes a growth enhancing component, in at least one example a co-polymer of fulvic acid and poly-metallic humates is present in the amount of from about 80% to about 90% by weight, based on a total weight of the fertilizer; a plurality of elements present in the amount of from about 3% to about 7% by weight, based on the total weight of the fertilizer; and one or more secondary nutrients, micronutrients, and biologically active heteromolecular trace-metal complexes present in the amount of from about 3% to about 10% by weight, based on the total weight of the fertilizer.

U.S. Pat. No. 9,382,166 appears to disclose a plant nutrition composition that includes long organic fibers having nitrogen, phosphorus and potassium available for plants, in combination with organic substratum providing pH balancing in the range of about 6.0 to about 7.0. The long fibers may be the end product of slow, heat-agitated anaerobic digestion of manure. Combined with the fibers are substratum such as pine bark composted for a duration in the range of between about 9 months and about 12 months.

U.S. Pat. No. 8,562,710 appears to disclose a storage stable fertilizer composition in the form of pellets or granules comprising an organic fertilizer in admixture with a water absorbent polymer. This invention also relates to a process for producing a storage stable fertilizer composition, the process comprising: i) mixing an organic fertilizer and a water absorbent polymer to form a mixture; ii) pelletizing or granulating the mixture; and iii) drying the pellets or granules for a time and under conditions sufficient to form a storage stable fertilizer composition.

U.S. Pat. No. 7,776,124 appears to disclose fertilizer compositions. The fertilizer compositions include one or more compounds having a high nitrogen content, which may be measured by a carbon to nitrogen atom ratio. Also provided are methods for increasing nitrogen content in soil, promoting crop production and fertilizing.

U.S. Pat. No. 6,194,193 appears to disclose a liquid and dry formulation that is suitable for use in enhancing plant growth which includes a plurality of *Bacillus* and *Paenibacillus* strains at least one of which function to produce phytohormones in a non-toxic form. The formulation also includes a phytohormone component and a phytohormone precursor to potentiate roots for colonization by the inoculated strains, as well as a low-level blend of nutrients and micronutrients for optimal plant development.

U.S. Pat. No. 5,733,355 appears to disclose bacterial preparation which comprises material belonging to genus *Bacillus*, producing lipopeptides which decrease surface tension of water, and possessing an ability to propagate in soil in the presence of vegetable cellulosic materials under anaerobic condition, and of bacteria belonging to genus *Bacillus* or genus *Clostridium*, producing cellulases and possessing an ability to propagate in soil in the presence of vegetable cellulosic materials, and preferably of bacteria belonging to genus *Bacillus* or genus *Clostridium*, fixing nitrogen and possessing an ability to propagate in soil in the presence of vegetable cellulosic materials under anaerobic conditions. Examples of lipopeptide-producing bacteria are: *B. subtilis, B. licheniformis, B. circulans*; examples of cellulases-producing bacteria are: *B. subtilis, B. licheniformis, B. circulans, B. polymyxa, B. coagulans, B. macetans, Cl. cellulolyticum, Cl. aerotolerans, Cl. acetobutylicum*, examples of nitrogen-fixing bacteria are: *B. azotofixans, B. macerans, B. polymyxa, Cl. acetobutylicum, Cl. pasturianum*.

U.S. Pat. No. 4,531,962 appears to disclose solution type fertilizers that are produced by reacting phosphoric acid with urea-ammonium nitrate solution (35 percent $CO[NH_2]_2$, 45 percent $NH_4NO_3$, and 20 percent $H_2O$), and urea. In the second embodiment of our invention, the same solution is produced by reacting phosphoric acid with a urea-ammonium nitrate suspension that contains 36 percent nitrogen, 56 percent urea, and 29 percent ammonium nitrate. The ammonium nitrate portion of the nitrogen solution in said first embodiment reacts with the urea and phosphoric acid to produce urea nitrate ($CO[NH]_2 \cdot HNO_3$) and ammonium phosphate (probably $NH_4H_2PO_4$). This solution contains rapidly available nitrate nitrogen as well as ammonium type nitrogen that is more slowly available than nitrate nitrogen. Similar results were obtained in said second embodiment when nitrogen solution and urea were reacted with sulfuric acid. The resulting solution contained $CO(NH_2)_2 \cdot HNO_3$ (urea nitrate) and $NH_4HSO_3$ (ammonium bisulfate). The products have a pH that is as low as 1.0 and as high as 4.5. It has been determined that in some soils these low pH materials may have some agronomic advantages as compared to other forms of NP fertilizers with higher pH (4.0 to 8.0). Germination studies show that when wheat seed is mixed with a 27-9-0 grade that is produced by said first embodiment of the instant invention, germination of seed is not adversely affected. This is a principal advantage of the present invention since it has been demonstrated to be a highly desirable procedure to ensure and promote early plant growth. On the other hand, tests show that when urea alone and ammonium phosphate (DAP), with a pH of alone, and combinations of these two materials are mixed with the seed, severe germination damage occurs.

U.S. Pat. No. 4,494,976 appears to disclose metal oxides which are applied to the surface of urea particles and chemically bonded to the urea by a heat-induced reaction. The product of this reaction is a free-flowing, relatively non-hygroscopic nitrogenous chemical fertilizer. By selecting metal oxides corresponding to a particular soil deficiency, beneficial micronutrients can be supplied simultaneously with nitrogen. Other materials, such as elemental sulfur, can be incorporated into the metal oxides prior to coating or can be liquefied and applied as a separate additional coating to the metal oxide-urea particles. In another embodiment, fertilizer particles are coated with metal oxides, covered with molten urea, and heated to induce a reaction. The formed reaction product remains as a layer on the exterior of the particle.

U.S. Pat. No. 4,180,392 appears to disclose organic fertilizers having a superior fertilizer response (or efficiency), and a higher nitrogen content but a lower water-insoluble type nitrogen content are prepared from spent liquors of sulfite pulp plants according to the method of the present invention. Said method comprises setting the solid matter concentration of said spent liquors in the reaction liquid consisting mainly of said spent liquors to 20-45% by weight and reacting therewith ammonia in an amount of 15-30 mol per 1 Kg of said solid matter, and oxygen or oxygen-containing gas at a reaction temperature of 90°-120° C. under a pressure of 4 $Kg/cm^2$ or higher and lower than 10 $Kg/cm^2$.

U.S. Pat. No. 4,026,695 appears to disclose a particulate multi-component soil additive, a method of applying that additive to soils to improve the agronomic quality of the same, and methods of producing such multi-component soil additives. The compositions comprise particle-form combinations of calcium sulfate and a nitrifier selected from urea, ammonium nitrate, and combinations of these, in which the nitrifier particles are coated with a layer of the reaction product of hydrated calcium sulfate and urea, ammonium nitrate, or both. This layer, in turn, contains an additional soil additive such as elemental sulfur or the major and minor plant nutrients such as phosphorus, potassium, magnesium, copper, zinc and the like. The particles are produced by reacting the particle-form nitrifier, preferably urea or ammonium nitrate prills, with hydrated calcium sulfate intimately mixed with one or more additional soil additives. Reaction is promoted by heating to a temperature sufficient to initiate the endothermic reaction without melting or thermally decomposing the nitrifier.

U.S. Pat. No. 3,630,710 appears to disclose a metabolic demand nitrogenous fertilizer or fertilizer base which releases nutrients into the soil in a controlled manner and in response to soil deficiencies is prepared by a process comprising the partial oxidation of organic materials at carefully controlled conditions of time, temperature and supplies of an oxidizing gas in a fluidized zone. Starting materials for the process include coal, bituminous or anthracitic, peat-moss, high chlorophyll content organic materials such as seaweeds, grasses, plant tops such as potato plant tops, sugar beet tops, and the like, seaweeds being a particularly effective type of material treated. Nitrogen, potassium, phosphorous, and sulfate values may be added to the partially oxidized organic materials by reaction with the corresponding element supplying materials.

United States Patent Application Publication Number 2005/0022569 appears to disclose methods for producing homogenous organic base fertilizer for plant nutrition and soil fertility. Also provided by the subject invention are value added fertilizer products for plant nutrition and soil fertility and concentrated liquid formulations/nutrient supplements that provide the value added nutrients to fertilizer products. Methods according to the invention involve the application of concentrated liquid(s) and/or dry formulation(s) comprising a mixture of one or more plant nutrient(s), one or more additional organic compound(s), one or more penetrant(s), and one or more optional supplement(s) into one or more organic base material(s). These organic base materials include, and are not limited to, biosolids, activated sludge, municipal compost, animal manures (e.g., horse, cow, chicken, pig, and sheep), and composted organic byproducts.

International Patent Publication Number WO 00/36085 appears to disclose a liquid and dry formulation suitable for use in enhancing plant growth which includes a plurality of *Bacillus* and *Paenibacillus* strains at least one of which function to produce phytohormones in a non-toxic form. The formulation also includes a phytohormone component and a phytohormone precursor to potentiate roots for colonization by the inoculated strains, as well as a low-level blend of nutrients and micronutrients for optimal plant development.

Australian Patent Number 2016101635 appears to disclose a carbon-based bio-organic fertilizer and its preparation method, the carbon-based bio-organic fertilizer by in parts by weight, including biochar 30 to 60 parts, sterile chicken 10-30 parts, bone meal 5-10 parts, bentonite 6-11 parts, refined wood vinegar liquid 2-5 parts, trace element additive 2-4 parts as well as 0.5-1 parts of the beneficial agents. With use of organic fertilizers based of the biochar of the present invention, it improved the capacity of retaining water and nutrients of the existing soil, and effectively increased soil fertility, purified the environment of the crop growth.

While the nutrient formulations and fertilizers disclosed supra have been known in the art for years, issues associated with formulation performance, while maintaining environmentally preferred characteristics remain largely problematic and/or unsolved. As such, there is a genuine demand for novel, multi-component hormone/nutrient formulations that, among other things, facilitate rapid uptake of nutrients, reduce growth time/cycle by one-third and in some cases by one-half, produce larger plants, fruits, and vegetables, and improve plant and fungi immunity.

These and other objects of the present invention will become apparent in light of the present specification, claims, chemical structures, chemical formulae, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a plant nutrient formulation comprising, consisting essentially of, and/or consisting of: (1) a solvent; (2) a first plant hormone; (3) a second plant hormone; (4) an optional surfactant/wetting agent; and (5) an optional colorant.

In a preferred embodiment of the present invention, the solvent comprises water.

In another preferred embodiment of the present invention, the first plant hormone is extracted from bark sap of a willow tree.

In yet another preferred embodiment of the present invention, the first plant hormone comprises a phenolic phytohormone.

In one preferred embodiment of the present invention, the first plant hormone comprises a weak acid and a conjugate base.

In a preferred implementation of the present invention, the first plant hormone is a weak polyprotic acid.

In another preferred implementation of the present invention, the first plant hormone is a weak diprotic acid.

In yet another preferred implementation of the present invention, the first plant hormone comprises a compound represented by the structure of formula (I):

wherein $R_1$-$R_6$ are each independently selected from the group consisting of H, OH, and an alkyl, aryl, alkoxy, alkanoyl, aroyl, alkenyl, and/or cyano group containing 1 to 25 carbon atom(s) with the proviso that at least one of $R_1$-$R_2$ is OH.

In one preferred implementation of the present invention, the first plant hormone comprises a compound represented by the structure of formula (II):

wherein $R_1$-$R_2$ are each independently selected from the group consisting of H, OH, and an alkyl, aryl, alkoxy, alkanoyl, aroyl, alkenyl, and/or cyano group containing 1 to 25 carbon atom(s) with the proviso that at least one of $R_1$-$R_2$ is OH.

In one preferred aspect of the present invention, the first plant hormone comprises a compound represented by the structure of formula (III):

Preferably, the first plant hormone comprises compounds represented by the structures of formulas (III) and (IV):

(IV)

[Chemical structure: salicylate anion with O⁻ X⁺ and OH groups on benzene ring with carbonyl]

wherein X is a counter cation.

In a preferred embodiment of the present invention, the second plant hormone comprises kelp.

In another preferred embodiment of the present invention, the second plant hormone comprises sargassum, and more preferably acid extracted, desalinized sargassum.

In yet another preferred embodiment of the present invention, the optional surfactant/wetting agent comprises a non-ionic surfactant, an anionic surfactant, a cationic surfactant, a zwitterionic surfactant, and combinations thereof.

In a preferred implementation of the present invention, the plant nutrient formulation further comprises an at least partially water-soluble calcium salt (e.g., calcium acetate, calcium carbonate, calcium chloride, calcium citrate, calcium gluconate, calcium lactate, calcium nitrate, etcetera).

In another preferred implementation of the present invention, the plant nutrient formulation further comprises a source of nitrogen, phosphorus, and/or potassium.

In yet another preferred implementation of the present invention, the plant nutrient formulation further comprises a vitamin and/or a mineral.

The present invention is also directed to a plant nutrient formulation comprising, consisting essentially of, and/or consisting of: (1) from approximately 75% to approximately 98% by weight a solvent, wherein the solvent is water; (2) from approximately 0.001% to approximately 25.0% a first plant hormone, wherein the first plant hormone are compounds represented by the structures of formulas (III) and (IV):

(III)

[Chemical structure: salicylic acid with OH and OH groups on benzene ring with carbonyl]

(IV)

[Chemical structure: salicylate anion with O⁻ X⁺ and OH groups on benzene ring with carbonyl]

wherein X is a counter cation; (3) from approximately 0.001% to approximately 25.0% a second plant hormone, wherein the second plant hormone comprises desalinized sargassum; (4) from approximately 0.5% to approximately 15.00% a surfactant/wetting agent; and (5) wherein any remainder comprises one or more adjunct agents.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

The invention will now be described with reference to the drawings wherein.

DETAILED DESCRIPTION OF THE INVENTION

Figure 1:
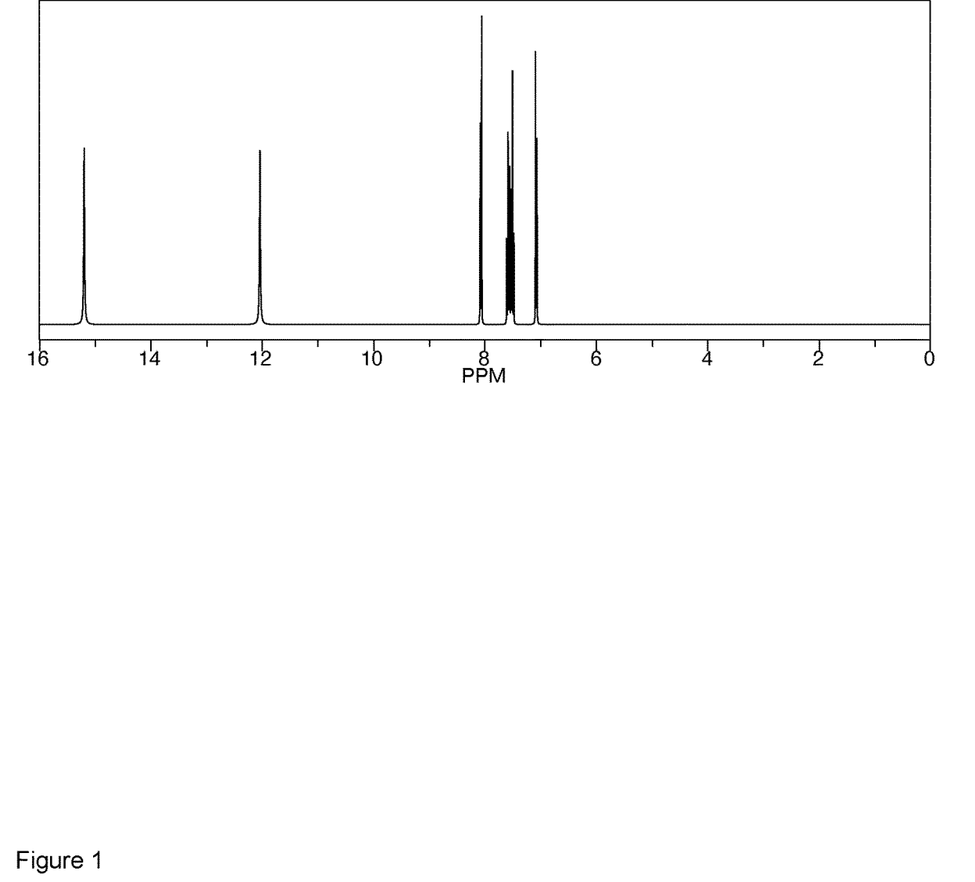
FIG. 1 of the drawings is a $^1$H-NMR spectrogram of a first plant hormone (salicylic acid)
Figure 2:
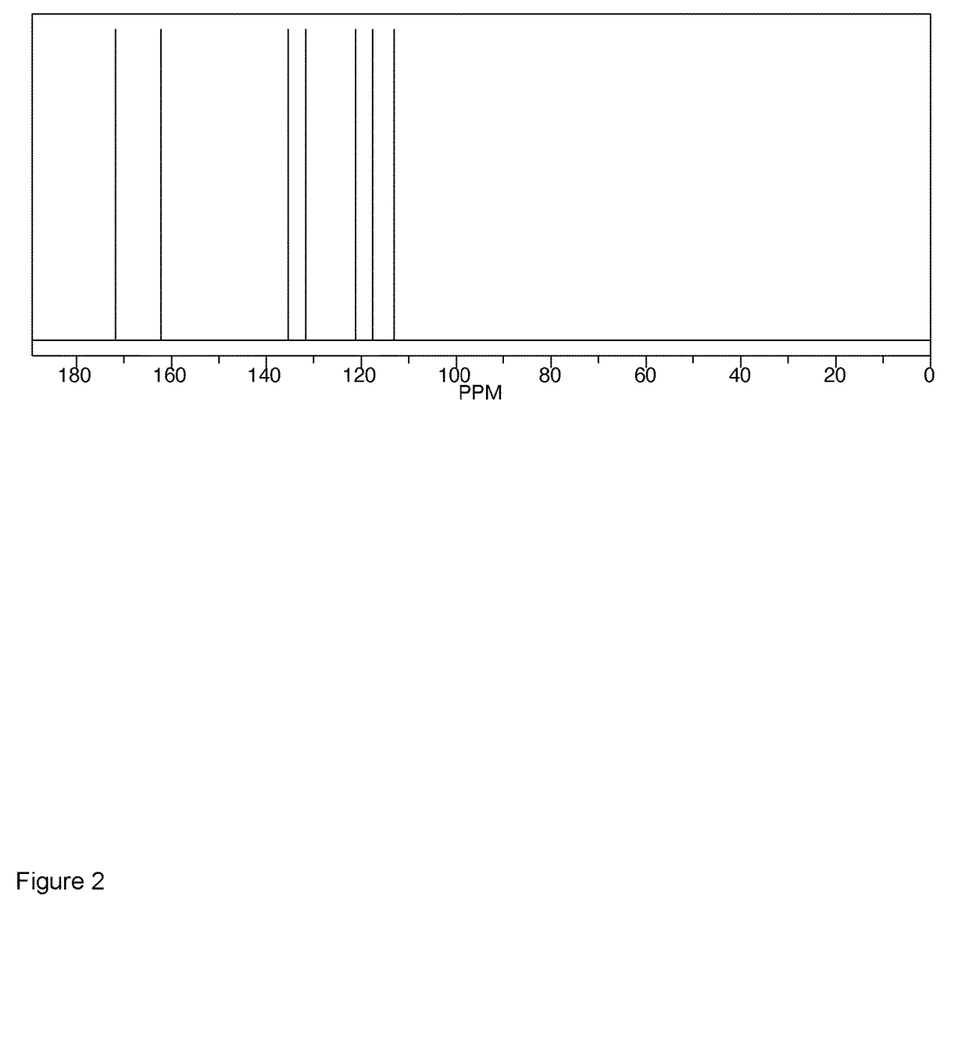
FIG. 2 of the drawings is a $^{13}$C-NMR spectrogram of the first plant hormone of FIG. 1.
Figure 3:
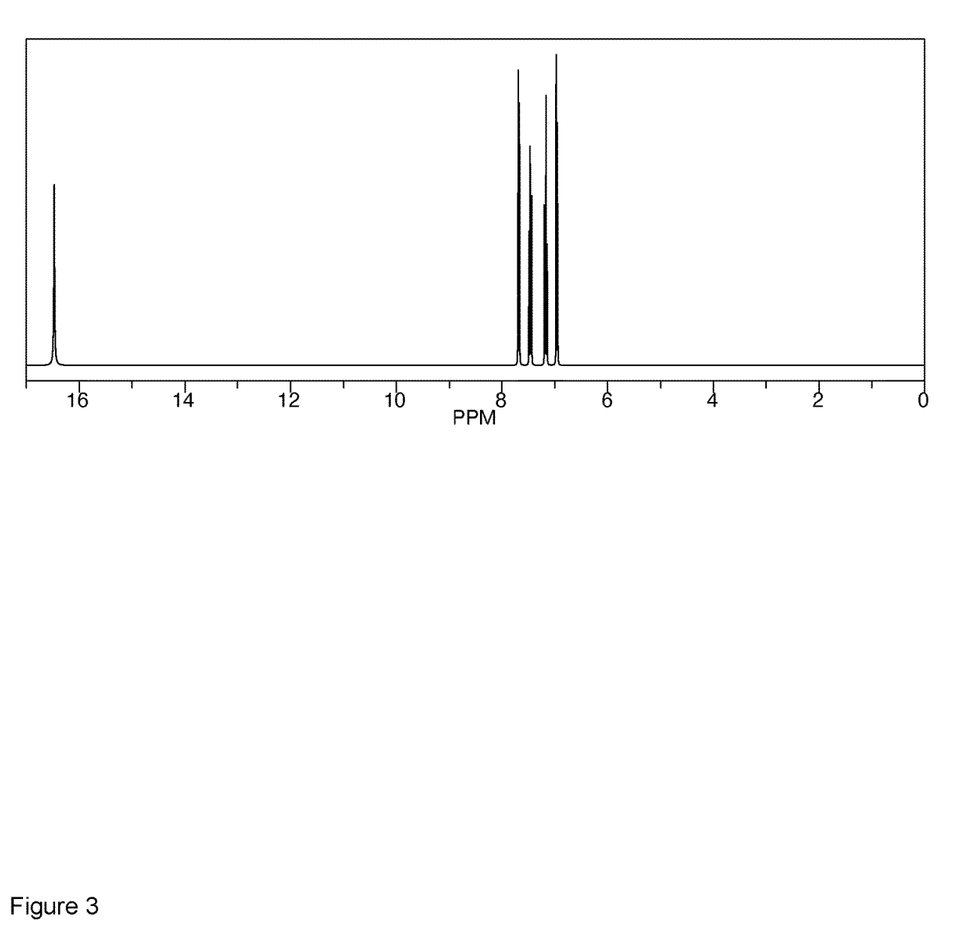
FIG. 3 of the drawings is a $^1$H-NMR spectrogram of a conjugate base (salicylate) of the first plant hormone of FIG. 1.
Figure 4:
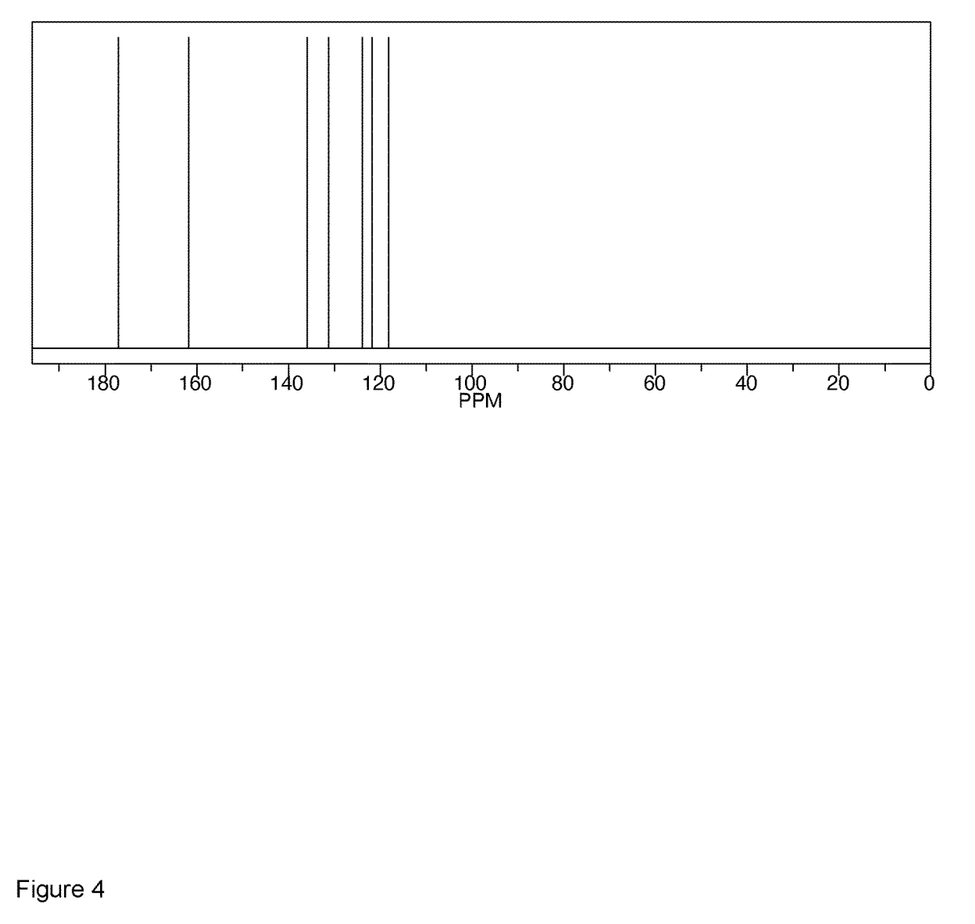
FIG. 4 of the drawings is a $^{13}$C-NMR spectrogram of the conjugate base of FIG. 3.

While this invention is susceptible of embodiment in many different forms, there is shown in the structural formulas and described herein in detail several specific embodiments with the understanding that the present disclosure is to be considered as an exemplification of the principles of the invention and is not intended to limit the invention to the embodiments illustrated. It will be understood that the structural formulas disclosed herein are intended to comprise all stereochemical configurations regardless of graphical representations.

In accordance with the present invention, plant nutrient formulations are disclosed herein that, among other things, facilitate rapid uptake of nutrients, reduce growth time/cycle by one-third and in some cases by one-half, produce larger plants, fruits, and vegetables, and improve plant and fungi immunity.

In one embodiment of the present invention, the plant nutrient formulation comprises: (1) an optional solvent; (2) a first plant hormone/nutrient; (3) a second plant hormone/nutrient; (4) an optional surfactant/wetting agent; and (5) an optional colorant.

For purposes of the present disclosure, the optional solvent of the formulation may comprise one or more of any one of a number of common, commercially available solvents, including polar solvents and/or non-polar solvents. Specific examples of preferred solvents include, for example, water, deionized, distilled, and/or reverse osmosis water, hexane, acetone, methyl ethyl ketone, toluene, benzene, ethers, 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed, for illustrative purposes only, as being suitable solvents, numerous other solvents that would be known to those having ordinary skill in the art having the present disclosure before them are likewise contemplated for use. Indeed, it will be understood that non-liquid or polymer type media are suitable for use in accordance with the present invention. Preferably, the solvent is present in a concentration ranging from approximately (i.e., +/−10 percent) 60 percent by weight to approximately (i.e., +/−10 percent) 98 percent by weight, and more preferably from approximately (i.e., +/−10 percent) 75 percent by weight to approximately (i.e., +/−10 percent) 98 percent by weight.

In accordance with the present invention, the first plant hormone/nutrient is preferably extracted from bark sap of a willow tree. Details regarding extraction and processing of one first plant hormone is provided in U.S. Pat. No. 9,067,840 entitled "Organic Plant Nutrient," which is hereby incorporated herein by reference in its entirety including all references cited therein. The first plant hormone may be organic and/or synthetic and preferably comprises a phenolic phytohormone and/or a weak acid and a conjugate base. In this embodiment, the first plant hormone is preferably a weak polyprotic acid, and more preferably, a weak diprotic acid.

In one embodiment of the present invention, the first plant hormone comprises a compound represented by the structure of formula (I):

(I)

wherein $R_1$-$R_6$ are each independently selected from the group consisting of H, OH, and an alkyl, aryl, alkoxy, alkanoyl, aroyl, alkenyl, and/or cyano group containing 1 to 25 carbon atom(s) with the proviso that at least one of $R_1$-$R_2$ is OH.

In another embodiment of the present invention, the first plant hormone comprises a compound represented by the structure of formula (II):

(II)

wherein $R_1$-$R_2$ are each independently selected from the group consisting of H, OH, and an alkyl, aryl, alkoxy, alkanoyl, aroyl, alkenyl, and/or cyano group containing 1 to 25 carbon atom(s) with the proviso that at least one of $R_1$-$R_2$ is OH.

In yet another embodiment of the present invention, the first plant hormone comprises a compound represented by the structure of formula (III):

(III)

In one implementation of the present invention, the first plant hormone comprises compounds represented by the structures of formula (III) and (IV):

(III)

(IV)

wherein X is a counter cation, such as, but not limited to, $Li^+$, $Na^+$, $K^+$, $Rb^+$, and $Cs^+$.

Preferably, the first plant hormone is present in a concentration ranging from approximately (i.e., +/−10 percent) 0.001 percent by weight to approximately (i.e., +/−10 percent) 25.00 percent by weight, and more preferably from approximately (i.e., +/−10 percent) 0.001 percent by weight to approximately (i.e., +/−10 percent) 25.00 percent by weight.

In accordance with the present invention, the second plant hormone/nutrient preferably comprises seaweed, algae, and/or sargassum. Preferably, the sargassum is desalinized such that the arsenic concentration is less than an approximately (i.e., +/−10 percent) 200 ppm, and more preferably less than approximately (i.e., +/−10 percent) 10 ppm. In this embodiment the sargassum is preferably acid extracted and desalinized. The second hormone of the present invention may be organic and/or synthetic.

Preferably, the second plant hormone is present in a concentration ranging from approximately (i.e., +/−10 percent) 0.001 percent by weight to approximately (i.e., +/−10 percent) 25.00 percent by weight, and more preferably from approximately (i.e., +/−10 percent) 0.001 percent by weight to approximately (i.e., +/−10 percent) 25.00 percent by weight. Preferably, the concentration ratio of the first plant hormone to the second plant hormone is at least approximately (i.e., +/−10 percent) 5:1, and more preferably at least approximately (i.e., +/−10 percent) 9:1, and yet more preferably at least approximately (i.e., +/−10 percent) 15:1.

For purposes of the present disclosure, the plant nutrient formulation preferably comprises one or more optional surfactants, such as, but not limited to, a non-ionic surfactant, an anionic surfactant, a cationic surfactant, a zwitterionic surfactant, and combinations thereof.

Non-limiting examples of preferred anionic surfactants include taurates; isethionates; alkyl and alkyl ether sulfates; succinamates; alkyl sulfonates, alkylaryl sulfonates; olefin sulfonates; alkoxy alkane sulfonates; sodium and potassium salts of fatty acids derived from natural plant or animal sources or synthetically prepared; sodium, potassium, ammonium, and alkylated ammonium salts of alkylated and acylated amino acids and peptides; alkylated sulfoacetates; alkylated sulfosuccinates; acylglyceride sulfonates, alkoxyether sulfonates; phosphoric acid esters; phospholipids; and combinations thereof. Specific anionic surfactants contemplated for use include, but are by no means limited to, ammonium cocoyl isethionate, sodium cocoyl isethionate, sodium lauroyl isethionate, sodium stearoyl isethionate, sodium lauroyl sarcosinate, sodium cocoyl sarcosinate, sodium lauryl sarcosinate, disodium laureth sulfosuccinate, sodium lauryl sulfoacetate, sodium cocoyl glutamate, TEA-cocoyl glutamate, TEA cocoyl alaninate, sodium cocoyl taurate, potassium cetyl phosphate.

Non-limiting examples of preferred cationic surfactants include alkylated quaternary ammonium salts $R_4NX$; alkylated amino-amides $(RCONH-(CH_2)_n)NR_3X$; alkylimidazolines; alkoxylated amines; and combinations thereof. Specific examples of anionic surfactants contemplated for use include, but are by no means limited to, cetyl ammonium chloride, cetyl ammonium bromide, lauryl ammonium chloride, lauryl ammonium bromide, stearyl ammonium chloride, stearyl ammonium bromide, cetyl dimethyl ammonium chloride, cetyl dimethyl ammonium bromide, lauryl dimethyl ammonium chloride, lauryl dimethyl ammonium bromide, stearyl dimethyl ammonium chloride, stearyl dimethyl ammonium bromide, cetyl trimethyl ammonium chloride, cetyl trimethyl ammonium bromide, lauryl trimethyl ammonium chloride, lauryl trimethyl ammonium bromide, stearyl trimethyl ammonium chloride, stearyl trimethyl ammonium bromide, lauryl dimethyl ammonium chloride, stearyl dimethyl cetyl ditallow dimethyl ammonium chloride, dicetyl ammonium chloride, dilauryl ammonium chloride, dilauryl ammonium bromide, distearyl ammonium chloride, distearyl ammonium bromide, dicetyl methyl ammonium chloride, dicetyl methyl ammonium bromide, dilauryl methyl ammonium chloride, distearyl methyl ammonium chloride, distearyl methyl ammonium bromide, ditallow dimethyl ammonium chloride, ditallow dimethyl ammonium sulfate, di(hydrogenated tallow) dimethyl ammonium chloride, di(hydrogenated tallow) dimethyl ammonium acetate, ditallow dipropyl ammonium phosphate, ditallow dimethyl ammonium nitrate, di(coconutalkyl)dimethyl ammonium chloride, di(coconutalkyl)dimethyl ammonium bromide, tallow ammonium chloride, coconut ammonium chloride, stearamidopropyl PG-imonium chloride phosphate, stearamidopropyl ethyldimonium ethosulfate, stearimidopropyldimethyl (myristyl acetate) ammonium chloride, stearamidopropyl dimethyl cetearyl ammonium tosylate, stearamidopropyl dimethyl ammonium chloride, stearamidopropyl dimethyl ammonium lactate, ditallowyl oxyethyl dimethyl ammonium chloride, behenamidopropyl PG dimonium chloride, dilauryl dimethyl ammonium chloride, distearly dimethyl ammonium chloride, dimyristyl dimethyl ammonium chloride, dipalmityl dimethyl ammonium chloride, distearyl dimethyl ammonium chloride, stearamidoproyl PG-dimonium chloride phosphate, stearamidopropyl ethyldiammonium ethosulfate, stearamidopropyl dimethyl (myristyl acetate) ammonium chloride, stearimidopropyl diemthyl cetaryl ammonium tosylate, stearamido propyl dimethyl ammonium chloride, stearamidopropyl dimethyl ammonium lactate.

Non-limiting examples of preferred non-ionic surfactants include alcohols, alkanolamides, amine oxides, esters (including glycerides, ethoxylated glycerides, polyglyceryl esters, sorbitan esters, carbohydrate esters, ethoxylated carboxylic acids, phosphoric acid triesters), ethers (including ethoxylated alcohols, alkyl glucosides, ethoxylated polypropylene oxide ethers, alkylated polyethylene oxides, alkylated polypropylene oxides, alkylated PEG/PPO copolymers), silicone copolyols. Specific examples of non-ionic surfactants contemplated for use include, but are by no means limited to, cetearyl alcohol, ceteareth-20, nonoxynol-9, C12-15 pareth-9, POE(4) lauryl ether, cocamide DEA, glycol distearate, glyceryl stearate, PEG-100 stearate, sorbitan stearate, PEG-8 laurate, polyglyceryl-10 trilaurate, lauryl glucoside, octylphenoxy-polyethoxyethanol, PEG-4 laurate, polyglyceryl diisostearate, polysorbate-60, PEG-200 isostearyl palmitate, sorbitan monooleate, polysorbate-80.

Non-limiting examples of preferred zwitterionic or amphoteric surfactants include betaines; sultaines; hydroxysultaines, amido betaines, amidosulfo betaines; and combinations thereof. Specific examples of amphoteric surfactants contemplated for use include, but are by no means limited to, cocoamidopropyl sultaine, cocoamidopropyl hydroxyl sultaine, cocoamidopropylbetaine, coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl (2-bishydroxy) carboxymethyl betaine, stearyl bis-(2-hydroxyethyl) carboxymethyl betaine, oelyl dimethyl gamma-carboxypropyl betaine, lauryl bis-(2-hydroxypropyl)alpha carboxymethyl betaine, coco dimethyl sulfopropyl betaine, stearyl dimethyl sulfopropyl betaine, lauryl dimethyl sulfoethyl betaine, lauryl bis(2-hydroxyethyl) sulfopropyl betaine, oleyl betaine, cocamidopropyl betaine.

Preferably, surfactant(s) are present in a concentration ranging from approximately (i.e., +/−10 percent) 0.5 percent by weight to approximately (i.e., +/−10 percent) 25 percent by weight, and more preferably from approximately (i.e., +/−10 percent) 0.5 percent by weight to approximately (i.e., +/−10 percent) 15 percent by weight.

In one preferred embodiment of the present invention, the plant nutrient solutions/formulations may comprise one or more optional adjunct agents including, but not limited to, water-soluble calcium salts, sources of nitrogen, phosphorus (e.g., bat guano), and/or potassium, sulfur, vitamins (e.g., vitamins C, D, $B_1$, $B_3$, $B_6$, $B_9$, $B_{12}$, etcetera), minerals, metals (e.g., iron, magnesium, etcetera), transition metals, silica, macro-nutrients, micro-nutrients, herbal additives, anti-oxidants, buffers, stabilizing agents (e.g., citric acid and/or its conjugate base), chelating agents, and/or colorants—just to name a few. It will be understood that the first and/or the second plant hormone may be associated with any combination of the foregoing adjunct agents.

Preferably, adjunct agent(s) are independently and/or collectively present in a concentration ranging from approximately (i.e., +/−10 percent) 0.005 percent by weight to approximately (i.e., +/−10 percent) 25 percent by weight, and more preferably from approximately (i.e., +/−10 percent) 0.1 percent by weight to approximately (i.e., +/−10 percent) 5 percent by weight.

In accordance with the present invention, the plant nutrient formulations may be liquids (e.g., concentrate, non-diluted, diluted, ready-to-use) gels, and/or solids (e.g., crystalized, dry, partially dehydrated, fully dehydrated, freeze dried).

It will be understood that other weights, weight ratios, and ranges are obtainable from the Examples provided hereinbelow. Provided below are non-limiting examples of plant nutrient formulations in accordance with the present invention.

Example 1

| Ingredient Name | Phase | Amount (% by Wt.) |
| --- | --- | --- |
| Water | A | q.s. to 100 |
| Salicylic Acid (SA) | A | 2.00 |
| Conjugate Base of SA | A | 0.50 |
| Kelp | A | 0.20 |

Example 2

| Ingredient Name | Phase | Amount (% by Wt.) |
| --- | --- | --- |
| Water | A | q.s. to 100 |
| Salicylic Acid (SA) | A | 2.00 |
| Conjugate Base of SA | A | 0.50 |
| Desalinized *sargassum* | A | 0.20 |

Example 3

| Ingredient Name | Phase | Amount (% by Wt.) |
| --- | --- | --- |
| Water | A | q.s. to 100 |
| Salicylic Acid (SA) | A | 2.00 |
| Conjugate Base of SA | A | 0.50 |
| Kelp | A | 0.20 |
| Surfactant | A | 3.75 |

Example 4

| Ingredient Name | Phase | Amount (% by Wt.) |
| --- | --- | --- |
| Water | A | q.s. to 100 |
| Salicylic Acid (SA) | A | 2.00 |
| Conjugate Base of SA | A | 0.50 |
| Desalinized *sargassum* | A | 0.20 |
| Surfactant | A | 3.75 |

Example 5

| Ingredient Name | Phase | Amount (% by Wt.) |
| --- | --- | --- |
| Water | A | q.s. to 100 |
| Salicylic Acid (SA) | A | 2.00 |
| Conjugate Base of SA | A | 0.50 |
| Desalinized *sargassum* | A | 2.00 |
| Kelp | A | 1.00 |
| Surfactant | A | 2.25 |
| Vitamin C | A | 0.25 |
| Vitamin B1 | A | 0.25 |
| Vitamin B3 | A | 0.25 |
| Vitamin B6 | A | 0.25 |
| Vitamin B9 | A | 0.25 |
| Vitamin B12 | A | 0.25 |
| Nitrogen Source | A | 1.00 |
| Potassium Source | A | 1.00 |
| Phosphorus Source | A | 1.00 |
| Sulfur | A | 0.50 |
| Silica | A | 1.25 |
| Iron | A | 3.00 |
| Magnesium | A | 1.75 |

Procedure

1. PHASE A in main vessel, add Phase A ingredients one at a time and mix until completely dissolved and uniform. A Silverson L5M-A homogenizer at 5,000 RPM expedites formation of the stable, homogenous dispersion/emulsion. It will be understood that water/solvent may be removed to form a dry product and/or replaced with a conventional filler.

It will be further understood that any reference to compounds disclosed herein includes salts and/or solvates of the same.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A plant nutrient formulation, comprising:
    approximately 97.3% by weight a solvent, wherein the solvent is water;
    approximately 2.5% by weight a first plant hormone, wherein the first plant hormone is a mixture of compounds represented by the structures of formulas (III) and (IV):

(III)

(IV)

wherein $X^+$ is a counter cation, and wherein the weight ratio of the structures of formulas III to IV is 4:1; and
    approximately 0.2% by weight a second plant hormone, wherein the second plant hormone comprises acid extracted, desalinized sargassum, wherein the arsenic concentration of the second plant hormone is less than 220 ppm.

2. The plant nutrient formulation according to claim 1, further comprising a surfactant/wetting agent selected from the group consisting of a non-ionic surfactant, an anionic surfactant, a cationic surfactant, a zwitterionic surfactant, and combinations thereof.

3. The plant nutrient formulation according to claim 1, further comprising a water-soluble calcium salt, a partially water-soluble calcium salt, or a combination thereof.

4. The plant nutrient formulation according to claim 1, further comprising a source of at least one of nitrogen, phosphorus, and potassium.

5. The plant nutrient formulation according to claim 1, further comprising at least one of a vitamin and a mineral.

* * * * *